United States Patent [19]
Binder et al.

[11] Patent Number: 4,687,901
[45] Date of Patent: Aug. 18, 1987

[54] MACHINE TOOL FOR CUTTING OR THE LIKE

[76] Inventors: Karl-Franz Binder, Ingolstädter Str. 22; Ladislaus Czermak, Spitzwegstrasse 3, both of D-8077 Reichertshofen, Fed. Rep. of Germany

[21] Appl. No.: 838,275

[22] Filed: Mar. 10, 1986

[30] Foreign Application Priority Data

Mar. 15, 1985 [DE] Fed. Rep. of Germany ....... 3509378

[51] Int. Cl.$^4$ ............................................. B23K 26/00
[52] U.S. Cl. ...................... 219/121 LG; 219/121 LU; 219/121 LY
[58] Field of Search ................. 219/121 LC, 121 LD, 219/121 LG, 121 LN, 121 LU, 121 LY, 121 LX, 121 LQ, 121 LR; 350/622

[56] References Cited

U.S. PATENT DOCUMENTS

| 4,088,865 | 5/1978 | Peters et al. | 219/121 L |
| 4,326,118 | 4/1982 | Smith | 219/121 LC |
| 4,555,610 | 11/1985 | Polad et al. | 364/474 X |

FOREIGN PATENT DOCUMENTS

| 2943228 | 12/1980 | Fed. Rep. of Germany. |
| 3011244 | 10/1981 | Fed. Rep. of Germany. |
| 3406676 | 9/1985 | Fed. Rep. of Germany ...... 219/121 LY |
| 3444045 | 6/1986 | Fed. Rep. of Germany. |

OTHER PUBLICATIONS

VDI Berichte 535, Verein Deutscher Ingenieure, VDI--Technologiezentrum, Physikalische Technologien, Materialbearbeitung Mit $CO_2$-Hochleistungslasern, Internationaler Workshop, 26 und 27 Mar., Dusseldorf.

*Primary Examiner*—C. L. Albritton
*Attorney, Agent, or Firm*—Karl F. Ross

[57] ABSTRACT

A laser cutting or trimming machine has a $CO_2$ laser producing a laser beam and a guiding and reorienting system for directing the laser beam to a workpiece to be processed. The focal point of the laser beam and/or the laser beam output member lies on a first rotation axis, around which all of the guiding and reorienting means and the laser beam are rotatable. The laser beam and the focal point of the laser beam is pivotable about a second rotation axis, which is oriented perpendicularly to the first rotation axis. The laser beam output member can perform a conical motion about the second rotation axis, whereby the focal point or the apex of the cone described by the conical motion of the beam output member does not leave the intersection point of the first and second rotation axes. This conical motion of the laser beam output member is programmable and the workpiece to be processed is held on a mounting device programmably movable in three dimensions. Thus the laser beam may be directed substantially perpendicularly to any accessible point on the surfaces of the workpiece according to a preprogrammed operating sequence.

10 Claims, 2 Drawing Figures

MACHINE TOOL FOR CUTTING OR THE LIKE

FIELD OF THE INVENTION

Our present invention relates to a machine tool, also referred to as a processing machine herein, especially for cutting and which uses a laser beam such as a $CO_2$ laser beam to which the workpiece is subject, i.e. which treats or cuts the workpiece.

BACKGROUND OF THE INVENTION

A laser-beam machine which can operate as a cutter or trimmer can comprise a $CO_2$ laser producing the laser beam and a beam guiding and reorienting means to properly direct the laser beam to the workpiece to be processed, for example, to be cut or trimmed.

In cutting a spatially irregular workpiece it is necessary to direct the laser radiation continuously perpendicularly on the position and/or surface to be acted on. In practice this means that troublesome and expensive mechanisms and/or electronic control devices must be provided.

OBJECTS OF THE INVENTION

It is an object of our invention to provide an improved machine tool for cutting, trimming or the like, which obviates the drawbacks of the prior art.

It is also an object of our invention to provide an improved laser-beam machine tool, in which laser radiation is used to cut, trim or similarly process a workpiece.

It is a further object of our invention to provide an improved laser-beam machining apparatus in which the workpiece and laser beam are properly oriented and controlled during processing by simple and inexpensive control means.

It is yet another object of our invention to provide an improved laser-beam machining apparatus which has a long life, a high precision and operating operational reliability.

SUMMARY OF THE INVENTION

These objects and others which will become more readily apparent hereinafter are attained in accordance with our invention in a laser-beam machining apparatus which can be used for cutting, trimming or the like comprising a $CO_2$ laser producing a laser beam and a guiding and reorienting means for directing the laser beam to a workpiece to be processed.

According to our invention the laser beam output member and/or the focal point of the laser beam lies on a first rotation axis around which all of the guiding and reorienting means and the laser beam output member are rotatable.

The laser beam output member and the focal point of the laser beam are pivotable about a second rotation axis which is oriented perpendicularly to the first rotation axis. The laser output beam member performs a conical motion about the second rotation axis, whereby the focal point and the apex of the cone described by that conical motion do not leave the intersection point of the first and second rotation axes. The workpiece to be processed is held on a mounting mechanism or device movable in three dimensions.

The apex of the output member and the focal point of the beam can both coincide with the machining point of the beam.

Our invention allows adequate workpiece orientation and positioning during operation and guarantees that the impinging laser radiation will always be directed perpendicularly on the surfaces of the workpiece with simpler means than those previously known. Since the means used, as already indicated, are known and tested, not only does a high operational reliability result, but also a high level of operating precision. Likewise a long life is expected for the laser-beam machining apparatus.

According to further features of our invention the laser beam travels from the laser into a protective first pipe segment, which runs coaxial to the first rotation axis and goes into a second pipe segment branching off at right angles from the first pipe segment. It continues into a third pipe segment branching off at right angles to the second pipe segment and parallel to the first pipe segment, and finally into a fourth pipe segment branching off perpendicularly from a free end of the third pipe segment so that the laser beam is then oriented perpendicularly to the first rotation axis. All of the pipe segments lie in a plane and at each of the junctions of the pipe segments an adjustable corner mirror is provided for guiding the laser beam.

Furthermore advantageously the mounting device or mechanism is equipped with a rotatable mounting plate for positioning the workpiece. By these features the above-mentioned advantages are attained in an optimal way, since the structures and components used are simple and are combined in a simple well-tested way.

In order to direct and maintain the laser radiation substantially perpendicular to the workpiece surface and concentrated on the first rotation axis at the place where the workpiece is mounted, between the fourth pipe segment directed toward the first rotation axis and the focal point of the laser radiation, we provide an auxiliary or additional pipe and guide member pivotable about the second rotation axis with two corner guide mirrors whose end piece supporting the laser output beam member includes an angular portion oriented at an angle of substantially 45° to the second rotation axis.

The machine not only works precisely on smooth items, but also on rough pieces such as highly irregularly shaped workpieces. According to our invention the additional pipe and guide members are mounted on a gantry supported between two lateral supporting members. The gantry is held nontwistably and is preferably counterweighted, to be driven rotatably i.e. angularly, about the first rotation axis and is programmable to respond automatically to continuously changing conditions. Simultaneously it serves to support the additional pipe and guide member whose motion about the second rotation axis is also programmable.

Similarly according to our invention it is advantageous to provide two sliding carriages and a mounting plate of the workpiece support with a raisable and lowerable mounting support of the mounting device movable in three dimensions (x, y and z directions) and equipped with programmable spindles and/or toothed racks the rotational motion of the mounting plate is also programmable.

The programming can be effected by computer numerical controllers (CNC) and other state-of-the-art electronic machining center controllers which are especially effective with the simple mechanisms for positioning the laser head and the workpiece as described.

BRIEF DESCRIPTION OF THE DRAWING

The above and other objects, features and advantages of our invention will become more readily apparent from the following description, reference being made to the accompanying highly diagrammatic drawing in which.

SPECIFIC DESCRIPTION

Figure 1:
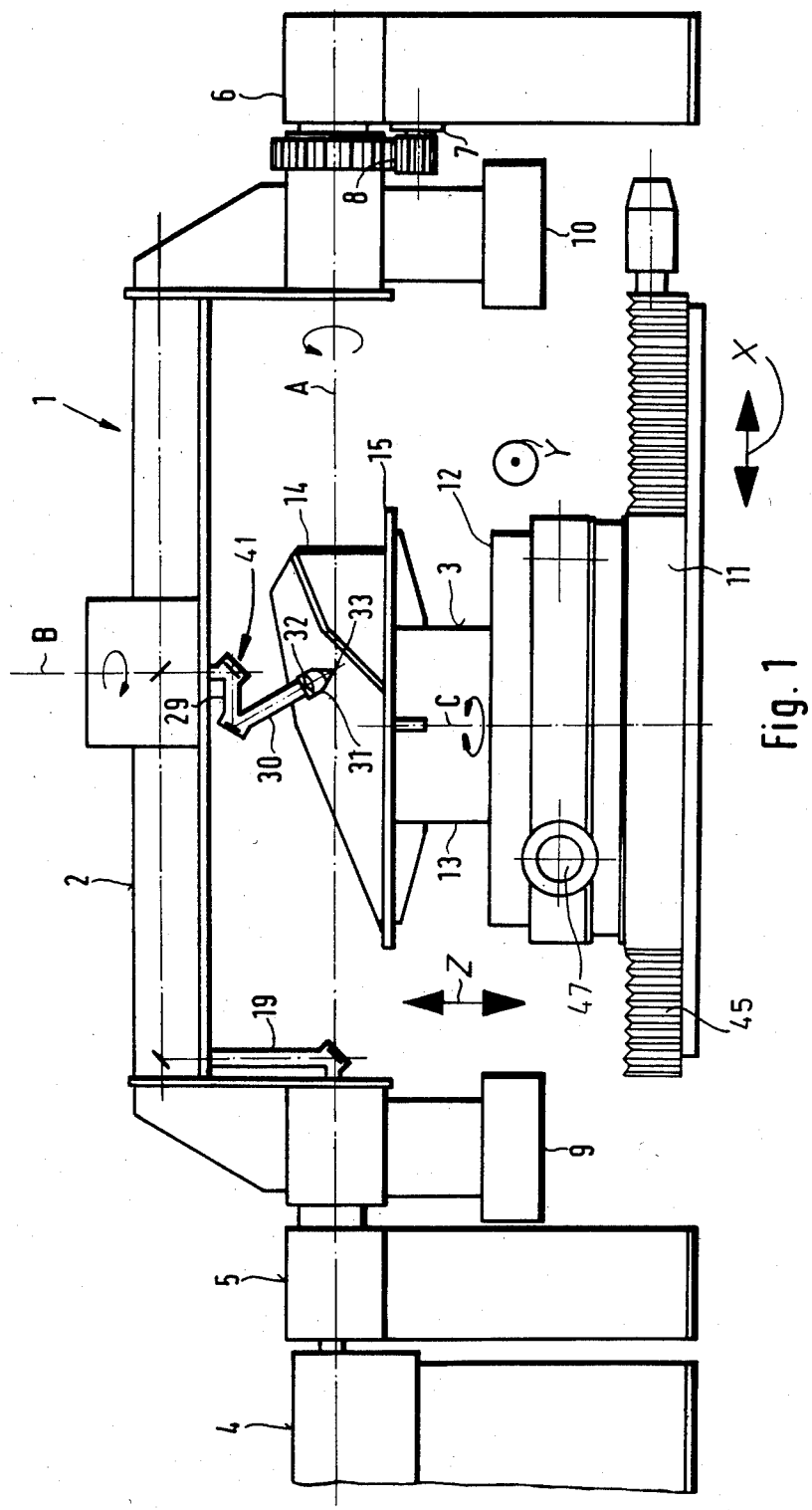
FIG. 1 is a side elevational view of a laser-beam machining apparatus according to our invention.

As is shown in FIG. 1 the laser-beam machining apparatus 1 comprises a framelike gantry 2, a workpiece mounting device 3, and a laser source 4.

Figure 2:
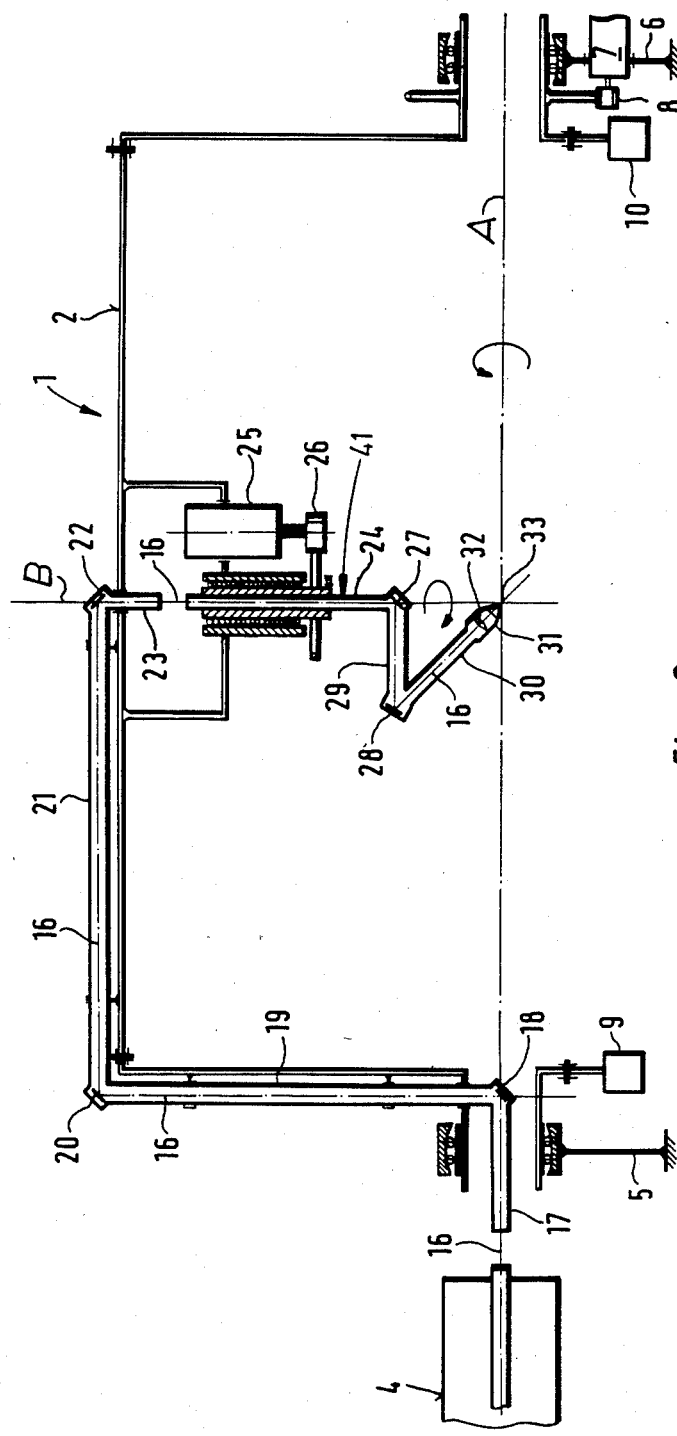
FIG. 2 is a side view showing the principal internal components of the laser-beam machining apparatus of FIG. 1.

The gantry 2 is pivotally supported on the lateral supporting members 5 and 6. It is pivotable about a first rotation axis a shown with the dot-dashed lines in FIGS. 1 and 2.

A motor 7 is provided on the supporting member 6, which acts on the gantry 2 by a rack-and-pinion gear drive 8. The counterweights 9 and 10 provide a ballast for the gantry 2. The reference character B indicates a vertical second rotation axis, which is oriented perpendicularly to the first horizontal rotation axis A.

The workpiece mounting device 3 comprises two crossing slide carriages 11 and 12. Each slide carriage 11 or 12 is movable in the X or Y axis direction shown in the drawing.

A spindle 45 or toothed rack 47 can be used to adjust the position of the slide carriages 11 and 12 at right angles to each other.

It is important that no play be present which could have a deleterious effect on the precision of the positioning of the workpiece.

The mounting device 3 also has a raisable and lowerable mounting support 13 for a workpiece 14, so that an additional degree of freedom results. Moreover the raisable and lowerable mounting support 13 for the workpiece 14 is equipped with a mounting plate 15, which can be rotated about a vertical third rotation axis C.

The laser beam 16 from laser 4 runs initially coaxially with the rotation axis A and enters a first pipe segment 17 which is coaxial with first rotation axis A. The laser beam 16 impinges on a corner mirror 18 at one end of the first pipe segment 17 which reflects the beam 16 into a second pipe segment 19 branching off at right angles from first pipe segment 17. Then the laser beam 16 passes through a third pipe segment 21 parallel to the first pipe segment 17, after being reflected from the corner mirror 20. It impinges on the corner mirror 22 at the end of third pipe segment 21 opposite to the end which corner mirror 20 occupies.

The laser beam 16 then extends along the second rotation axis B which is perpendicular to the first rotation axis A. The laser beam 16 is sent toward the rotation axis A from the corner mirror 22 through a fourth pipe segment 23 oriented at right angles to the third pipe segment 21. The laser beam 16 then passes through an additional pipe and guide member 41 comprising protective pipe segments 24, 29 and 30 having suitably positioned reflecting corner mirrors 27 and 28. To provide rotatability a motor 25 provided with a rack and pinion gear drive engaging additional pipe and guide member 41.

The pipe segment 24 which follows second rotation axis B coaxially is connected to another intermediate pipe segment 29 attached at right angles to it and which is equipped with reflecting corner mirrors 27 and 28 at each end. At its other end intermediate pipe segment 29 is connected to an end piece or final pipe segment 30, which is inclined at an angle of 45° to the second rotation axis B. The end piece 30 has a laser beam output member 31 at its free end, through which the laser beam 16 is focused by a lens 32 on the point 33 where the rotation axes A and B intersect.

When the additional pipe and guide member 41 with the reflecting corner mirror 27 is pivoted about the second rotation axis B, the focal point 33 of the laser beam is not changed or moved. The laser beam 16 and the laser beam output member 31—figuratively speaking—form the surfaces of a light cone and the apex of the cone does not leave the aforementioned intersection point 33. With this arrangement it is possible together with the numerous degrees of freedom movement to direct the focused beam 16 perpendicularly on a surface of the workpiece 14 to be cut even when the workpiece 14 has an irregular shape.

With the arrangement according to our invention no complicated or troublesome auxiliary aids are used so that not only a highly operable system results, but also a high process precision is possible. The apparatus according to our invention can be modified so that it can perform other fuctions such as welding.

By definition the guiding and reorientation means referred to in the summary comprises the gantry 2, the lateral supporting members 5 and 6, the motor 7, the sliding carriages 11 and 12, the various pipe segments and corner mirrors and all other components required to bring the laser beam 16 to the appropriate position on the workpiece.

We claim:

1. In a laser machining apparatus which can be used for cutting, trimming or the like comprising a $CO_2$ laser producing a laser beam and a guiding and reorienting means for directing said laser beam to a workpiece to be processed, the improvement wherein a focal point of said laser beam lies on a first rotation axis around which said guiding and reorienting means and a laser beam output member are rotatable, said laser beam output member and said focal point of said laser beam being pivotable about a second rotation axis, oriented perpendicularly to said first rotation axis, said laser beam output member describing a conical motion about said second rotation axis, whereby said focal point and the apex of the cone described by said conical motion remains at the intersection point of said first and second rotation axes, and said workpiece is held on a mounting device movable in three dimensions.

2. The improvement according to claim 1 wherein said mounting device is equipped with a rotatable mounting plate on which said workpiece is held.

3. The improvement according to claim 2 wherein said laser beam travels from said $CO_2$ laser into a protective first pipe segment, which lies coaxial to said first rotation axis and extends to a second pipe segment branching off at right angles from said first pipe segment, said second pipe segment extending to a third pipe segment branching off at right angles from said second pipe segment, and a fourth pipe segment branching off from said third pipe segment perpendicularly to said first rotation axis, whereby all of said pipe segments lie in a plane and at each of the junctions of said pipe segments an adjustable corner mirror is provided for guiding said laser beam.

4. The improvement according to claim 3 Wherein between said fourth pipe segment directed toward said first rotation axis and said focal point of said laser beam an additional pipe and guide member pivotable about said second rotation axis is disposed and is provided with two of said corner mirrors and an end piece supporting said laser beam output member having an angular portion oriented at an angle of substantially 45° to said second rotation axis.

5. The improvement according to claim 4 wherein said additional pipe and guide member is placed on a gantry supported between two lateral supporting members provided with counterweights, whereby said gantry is held nontwistably while being driven rotatably about said first rotation axis and programmable to respond to continuously changing processing conditions, said gantry serving to support said additional pipe and guide member whose motion about said second rotation axis is also programmable.

6. The improvement according to claim 5 wherein two sliding carriages are provided with a raisable and lowerable mounting support carrying said mounting plate and forming said mounting device movable in three dimensions by programmable position adjusting means, and the rotational motion of said mounting plate being also programmably adjustable.

7. The improvement according to claim 6 wherein said programmable position adjusting means comprises at least one spindle.

8. The improvement according to claim 6 wherein said programmable position adjusting means comprises at least one toothed rack.

9. A laser-beam machining apparatus which can be used for cutting, trimming or the like comprises a $CO_2$ laser for producing a laser beam, a guiding and reorienting means for directing said laser beam to a workpiece to be processed, a mounting device movable adjustably in three dimensions for said workpiece, a laser beam output member of said guiding reorienting means from which a focused laser beam is emitted to impinge on said workpiece, a first rotation axis around which all of said guiding and reorienting means are rotatable, and a second rotation axis, which is oriented substantially perpendicularly to and intersecting said first rotation axis, wherein the apex of the cone described by a conical motion of said laser beam output member about said second rotation axis and the focal point of said focused laser beam do not leave the intersection point of said first and second rotation axes.

10. A laser machining apparatus comprising:
a workpiece support comprising two mutually perpendicular slides and an elevating mechanism adapted to move a workpiece in three mutually perpendicular directions, and a turntable on said slides and said mechanism carrying said workpiece for rotating said workpiece about an upright axis;
a laser output head emitting a laser beam trained on said workpiece carried by said support and having a machining location of said beam;
a laser generating said beam;
beam conducting members defining a beam path between said laser and said head; and
means mounting said members for rotation of said members and said head about a horizontal axis and means for rotating said head about a vertical axis with said head oriented so that said beam has an axis inclined to said vertical and horizontal axis whereby said machining location remains in position upon rotation of said members about said horizontal axis and said head about said vertical axis.

* * * * *